United States Patent
Bartucca et al.

(10) Patent No.: US 6,918,067 B2
(45) Date of Patent: Jul. 12, 2005

(54) DETECTING NETWORK INSTABILITY

(75) Inventors: Francis Michael Bartucca, Raleigh, NC (US); Clark Debs Jeffries, Durham, NC (US); Rosemary Venema Slager, Cary, NC (US); Norman Clark Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 10/135,296

(22) Filed: Apr. 30, 2002

(65) Prior Publication Data

US 2003/0204787 A1 Oct. 30, 2003

(51) Int. Cl.[7] .............................................. G06F 11/00
(52) U.S. Cl. ................................ 714/47; 714/4; 714/43; 370/229; 370/232; 709/223; 709/224; 709/225
(58) Field of Search ............................ 714/4, 5, 6, 43, 714/47, 53, 763; 711/3; 370/229, 232; 709/223–225

(56) References Cited

U.S. PATENT DOCUMENTS

| | | | |
|---|---|---|---|
| 4,979,118 A | 12/1990 | Kheradpir | 364/436 |
| 5,193,151 A | 3/1993 | Jain | 395/200 |
| 5,253,161 A | 10/1993 | Nemirovsky et al. | 364/402 |
| 5,500,855 A | 3/1996 | Hershey et al. | 370/17 |
| 5,583,792 A | 12/1996 | Li et al. | 364/514 |
| 5,699,369 A | 12/1997 | Guha | 371/4 |
| 5,854,903 A | 12/1998 | Morrison et al. | 395/200.79 |
| 5,870,564 A | 2/1999 | Jensen et al. | 395/200.71 |
| 5,949,786 A | 9/1999 | Bellenger | 370/401 |
| 5,983,269 A | 11/1999 | Mattson et al. | 709/221 |
| 6,067,572 A | 5/2000 | Jensen et al. | 709/241 |
| 6,170,015 B1 | 1/2001 | Lavian | 709/232 |
| 6,192,406 B1 | 2/2001 | Ma et al. | 709/226 |
| 6,499,088 B1 * | 12/2002 | Wexler et al. | 711/152 |
| 6,532,493 B1 * | 3/2003 | Aviani et al. | 709/224 |
| 6,615,235 B1 * | 9/2003 | Copeland et al. | 709/203 |
| 6,816,457 B1 * | 11/2004 | Bahattab | 370/232 |
| 2002/0099982 A1 * | 7/2002 | Andersen et al. | 714/47 |
| 2004/0205298 A1 * | 10/2004 | Bearden et al. | 711/137 |

* cited by examiner

*Primary Examiner*—Scott Baderman
*Assistant Examiner*—Emerson Puente
(74) *Attorney, Agent, or Firm*—Robert A. Voigt, Jr.; Winstead Sechrest & Minick P.C.; Josh Cockburn

(57) ABSTRACT

A method, system and computer program product for detecting conditions of network instability. An attribute indicative of network instability, e.g., processor and/or co-processor utilization, packet arrival rates, packet peak rates, packet size distribution, packet clustering tendencies, buffer usage patterns, occurrence of peak utilization, out-of-buffer conditions, packet discard rates, may be monitored for a network device, e.g., router. The monitored attribute may be associated with a plurality of labels (variables) where a portion of those labels may be stored in a cache. A hit ratio for the cache storing labels associated with the monitored attribute may be tracked within a period of time based on the number of requested items, i.e., labels, that are currently stored in the cache. A condition of network instability may then be detected based on the hit ratio by determining if the absolute value of the acceleration of the hit ratio exceeds a threshold.

30 Claims, 7 Drawing Sheets

DETECTING NETWORK INSTABILITY

TECHNICAL FIELD

The present invention relates to the field of monitoring network devices, and more particularly to detecting conditions of network instability based on the acceleration of the hit ratio of a particular attribute, e.g., packet arrival rates, buffer usage patterns, packet discard rates, out-of-buffer conditions, monitored.

BACKGROUND INFORMATION

A network generally includes a number of devices connected to allow inter-device communication. As the size of a network increases, it becomes increasingly important to effectively and efficiently monitor and manage the network. Typically, a site commonly referred to as a management control console (also known as a central management station) may communicate with an entity (commonly referred to as an agent) in a device, e.g., router, switch, in order to be able to monitor and manage that device. The management control console may be able to monitor and manage the device by obtaining and configuring various parameters. Usually, the agent is comprised of software that may be running on an embedded device microprocessor (internal to the networking hardware). The management control console may communicate with the agent using a transport mechanism such as the Simple Network Management Protocol (SNMP) to monitor and configure the attributes of the device.

The parameters or attributes that an agent can monitor may be described in a Management Information Base (MIB). MIB specifications are typically stored in text files where each entry in the MIB may describe some attribute the agent can monitor. For example, the agent may be able to monitor the processor and/or co-processor utilization over time and peak utilization levels for the monitored network device. Other examples may include packet arrival rates, packet peak rates, packet size distribution, packet clustering tendencies, buffer usage patterns, occurrence of peak utilization, out-of-buffer conditions and packet discard rates.

Under normal conditions, network traffic flows through multiple intermediate devices to reach a specific destination. However, during periods of network instability, data may be discarded or lost due to hardware or software failures. Network instability may refer to abnormal situations that cause a device in the network to become overloaded thereby causing the device to process packets at a slower rate or even crash. For example, the device may receive an inordinate amount of packets to be processed exceeding its processing capability. In another example, the device may receive an inordinate amount of requests to be serviced such as in a denial-of-service attack that exceeds the processing capacity of the device.

Typically, network instability situations that cause one or more network devices to become overloaded do not become detected until well after the loss or discarding of data. If, however, a parameter that indicates network instability situations was monitored, then a network instability situation may be detected prior to the instability situation significantly affecting the network. Some of the parameters that indicate network instability may be the attributes found in the MIB.

It would therefore be desirable to detect conditions of network instability by monitoring a parameter or attribute of a network device, e.g., router, switch, that may be used to indicate network instability thereby detecting network instability situations earlier than in prior art.

SUMMARY

The problems outlined above may at least in part be solved in some embodiments by monitoring an attribute, e.g., processor and/or co-processor utilization, packet arrival rates, packet peak rates, packet size distribution, packet clustering tendencies, buffer usage patterns, occurrence of peak utilization, out-of-buffer conditions, packet discard rates, of a network device, e.g., router, indicative of network instability. The attribute may be associated with a plurality of labels (variables) where a portion of those labels may be stored in a cache. A hit ratio for the cache storing labels associated with the monitored attribute may be tracked within a period of time based on the number of requested labels that are stored in the cache. A condition of network instability may then be detected based on the hit ratio. For example, if the absolute value of the acceleration of the hit ratio exceeds a threshold, then a condition of network instability may be detected. That is, an accelerated change in the hit ratio may indicate an unstable condition.

In one embodiment of the present invention, a method for detecting conditions of network instability may comprise the step of monitoring an attribute indicative of network instability, e.g., processor and/or co-processor utilization, packet arrival rates, packet peak rates, packet size distribution, packet clustering tendencies, buffer usage patterns, occurrence of peak utilization, out-of-buffer conditions, packet discard rates, of a network device, e.g., router, in relation to receiving a plurality of packets of data. That is, the attribute indicative of network instability may be monitored in response to receiving a plurality of packets of data over a period of time.

Each monitored attribute may be associated with a plurality of labels. Labels may refer to variables. A portion of the labels associated with the monitored attribute may be stored in a cache. For example, for monitoring the attribute of packet size distribution, label "A" may be associated with packet lengths between 16 and 32 bytes. Label "B" may be associated with packet lengths 32 and 64 bytes. Label "C" may be associated with packet lengths 64 and 84 bytes. Label "D" may be associated with packet lengths between 84 and 128 bytes and so forth. A portion of these labels may be stored in a cache.

Upon monitoring the attribute of the network device, e.g., router, after a period of time, the next item, i.e., the next label, may be determined. For example, if the packet length of the next received packet had a length of 80 bytes, then the next label requested may be label "C" using the above example. If the label is present in the cache, a "cache hit" is said to occur. However, if the next label, e.g., label "G", is not present in the cache, then a "cache miss" is said to occur. A hit ratio as used herein may refer to the following equation:

$$\text{Hit Ratio} = \frac{\text{number of cache hits}}{(\text{number of cache hits} + \text{number of cache misses})}$$

Hence, a hit ratio may be based on the number of requested items, i.e., labels, that are currently stored in the cache.

A hit ratio (denoted as $h(t)$) for a cache may then be tracked within a particular period of time (denoted as dt). That is, the hit ratio for a cache storing the labels associated with a monitored attribute may be measured every particular period of time (denoted as dt).

A determination may then be made as to whether the absolute value of the acceleration of the hit ratio is less than a threshold value. The absolute value of the acceleration of the hit ratio is determined by the absolute value of the second derivative of the hit ratio which may be approximated by the absolute value of the following equation:

$$(h(t-2*dt)-2*h(t-dt)+h(t))/2$$

where t is an index of time; where dt is a time interval that the hit ratio h(t) is measured; and where h(t) is the hit ratio at time t.

If the absolute value of the acceleration of the hit ratio is less than a threshold value (denoted as T), then the network device did not detect a condition of network instability. That is, if there is not an accelerated change in the hit ratio of a cache storing labels associated with a monitored attribute indicative of network instability, then the network device did not detect a condition of network instability.

A determination may be made as to whether the network device failed to detect a network instability situation. A determination as to whether the network device failed to detect a network instability situation may be made by a network administrator. If the network device failed to detect a network instability situation, then the value of the threshold value (T) may be decreased to:

$$T(\text{new})=(1-K)*T(\text{old})$$

where K is a constant between the values of 0 and 1; where T(old) is a threshold value prior to being decreased; and where T(new) is a threshold value after being decreased.

By decreasing the value of the threshold, a lower absolute value of the acceleration of the hit ratio is required to detect a condition of network instability. Hence, an expanded number of situations or conditions may be deemed to be indicative of network instability.

If, however, the network device correctly identified a non-network instability situation, then the value of the threshold value (T) remains unchanged.

As stated above, a determination may be made as to whether the absolute value of the acceleration of the hit ratio is less than a threshold value. If the absolute value of the acceleration of the hit ratio is greater than or equal to the threshold value (T), then the network device detected a condition of network instability. That is, an accelerated change in the hit ratio may indicate an unstable condition. For example, a cache may store labels associated with a monitored attribute, e.g., packet size distribution, indicative of network instability. If the cache experiences an accelerated change in the hit ratio, then an unstable condition may be indicated. For example, an accelerated change in the hit ratio indicating an influx in the number of received packets may indicate receipt of an unusually high number of packets, i.e., high packet peak rates, which may cause the network device to become overloaded thereby causing the network device to process packets at a slower rate or even crash. Hence, detecting an accelerated change in the hit ratio may detect a condition of network instability.

The network device may then transmit an alert to a management control console (also referred to as a central management station) indicating the detection of a condition of network instability.

A determination may then be made by a network administrator as to whether the condition detected is a valid condition of network instability. A detection of network instability may not be an administrative emergency and hence may be deemed to not be a valid condition of network instability. For example, the network device may receive an influx of packets at around 3:00 p.m. to 3:15 p.m. each workday that may cause an accelerated change in the hit ratio when the hit ratio is tracked during that time. If this is a temporary phenomenon that happens each workday, a network administrator may determine not to take corrective action. Hence, the network administrator may deem the condition detected to not be a valid condition of network instability.

If the condition detected is determined to not be a valid condition of network instability, then the value of the threshold value (T) may be increased to:

$$T(\text{new})=(1-K)*T(\text{old})+K*\text{MAX}$$

where K is a constant between the values of 0 and 1; where T(old) is a threshold value prior to being increased; where T(new) is a threshold value after being increased; and where MAX is a maximum value.

By increasing the value of the threshold, a higher absolute value of the acceleration of the hit ratio is required to detect a condition of network instability. Hence, a more limited number of situations or conditions may be deemed to be indicative of network instability.

If, however, the condition detected is determined to be a valid condition of network instability, then the value of the threshold value (T) remains unchanged.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
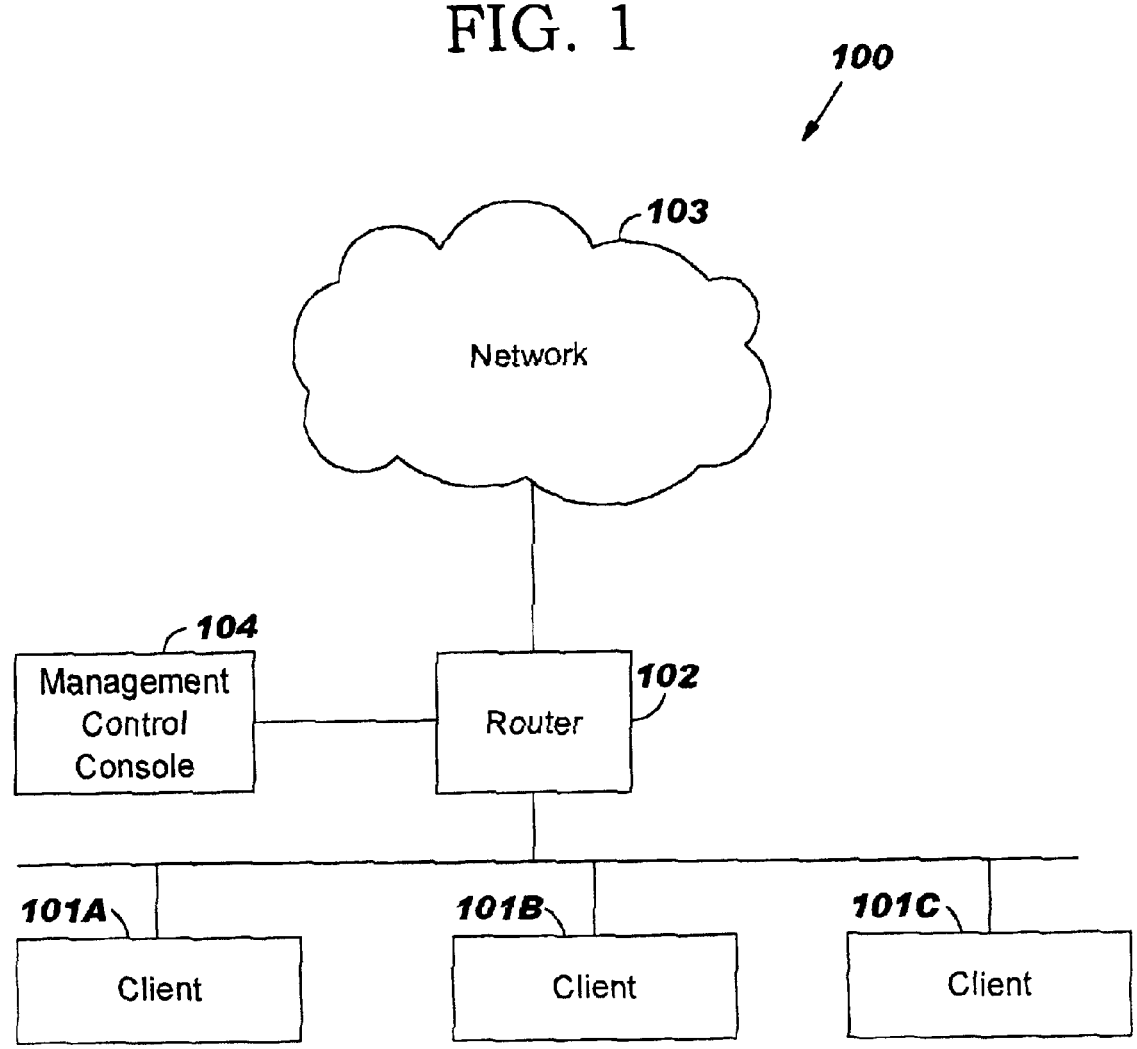
FIG. 1 illustrates a network system configured in accordance with the present invention.

FIG. 1—Network System

FIG. 1 illustrates an embodiment of a network system 100 in accordance with the present invention. Network system 100 may comprise one or more clients 101A–C coupled to a router 102. Clients 101A–C may collectively or individually be referred to as clients 101 or client 101, respectively. A more detailed description of client 101 is provided below in conjunction with FIG. 2. A more detailed description of router 102 is provided further below in conjunction with FIG. 3. Network system 100 may further comprise a network 103 coupled to router 102. Router 102 may be configured to forward packets of data issued from clients 101 to network 103. Network 103 may be a Local Area Network (LAN), e.g., Ethernet, Token Ring, ARCnet or a Wide Area Network (WAN), e.g., Internet. Network system 100 may further comprise a management control console 104 (also referred to as a central management station) coupled to router 102. It is noted that the connection between clients 101 and router 102 may be any medium type, e.g., wireless, wired. It is further noted that client 101 may be any type of device, e.g., wireless, Personal Digital Assistant (PDA), portable computer system, cell phone, personal computer system, workstation, Internet appliance, configured with the capability of connecting to network 103. In one embodiment, clients 101A–C may be coupled to router 102 located at the edge of a subnet (not shown), e.g., Local Area Network (LAN), where the subnet may comprise clients 101A–C coupled to router 102. It is noted that network system 100 may be divided into multiple subnets where each subnet (not shown), e.g., Local Area Network (LAN), Campus LAN, may be an interconnected, but independent, segment or domain of network system 100. It is further noted that network system 100 may be any type of system that has at least one client 101, a management control console 104 and a router 102. It is further noted that network system 100 is not to be limited in scope to any one particular embodiment. For example, router 102 may be a router located at the edge of a subnet. In another example, router 102 may be a switch configured to direct the flow of data from one network to another network.

Referring to FIG. 1, management control console 104 may be configured to communicate with router 102 in order to monitor and manage router 102. Management control console 104 may be able to monitor and manage router 102 by obtaining and configuring various parameters. Management control console 104 may communicate with router 102 using a transport mechanism such as the Simple Network Management Protocol (SNMP) to monitor and configure the attributes of router 102.

Figure 4:
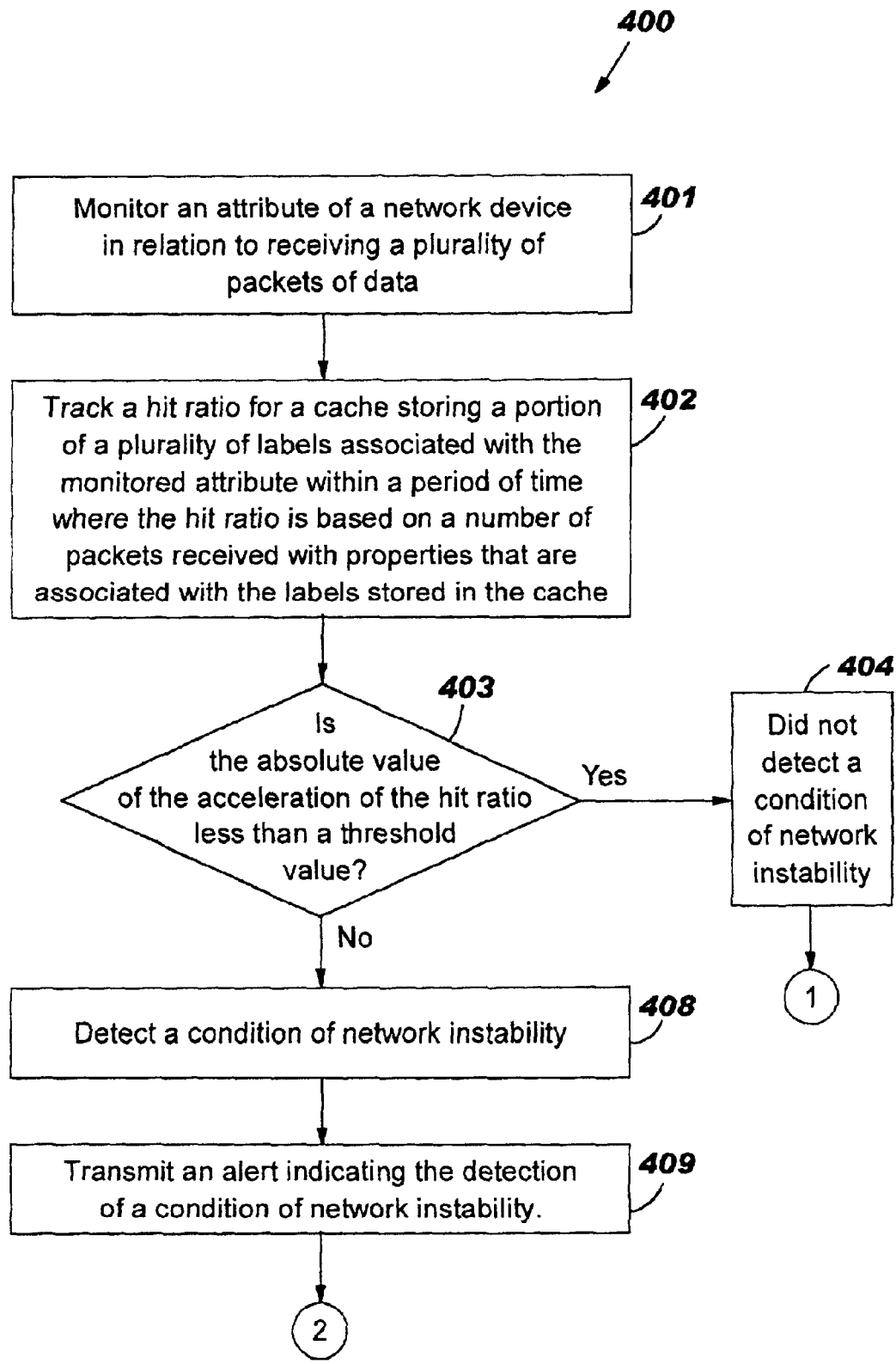
FIG. 4 is a flowchart of a method for detecting conditions of network instability in accordance with the present invention.
Figure 4:
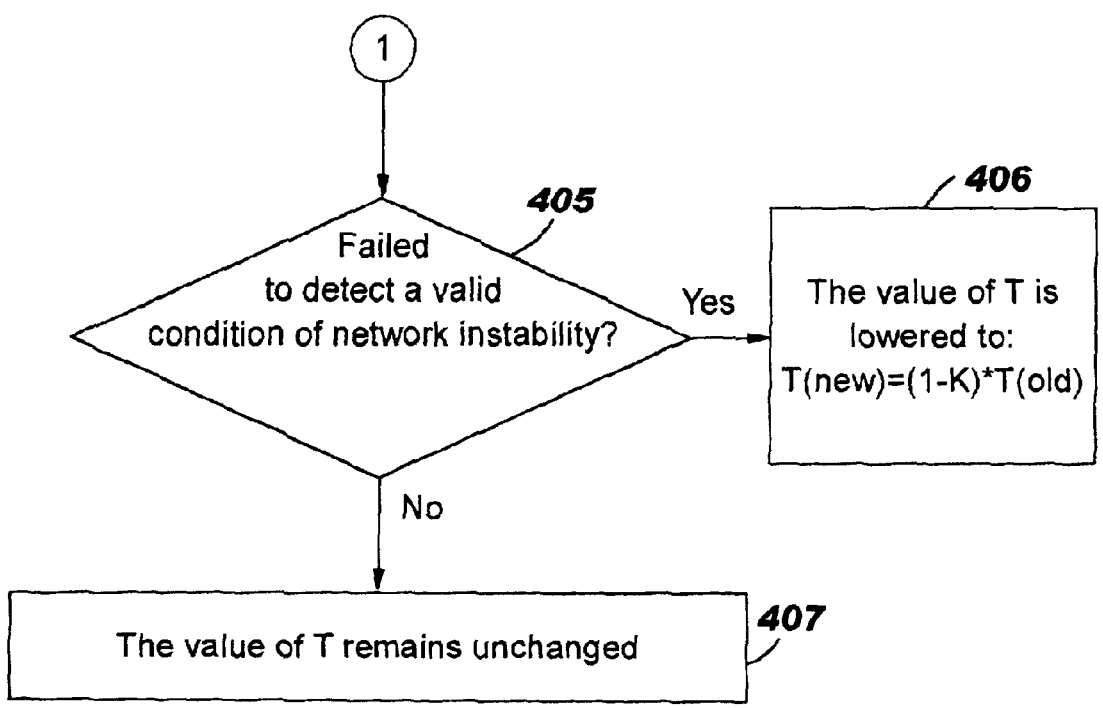
Figure 4:
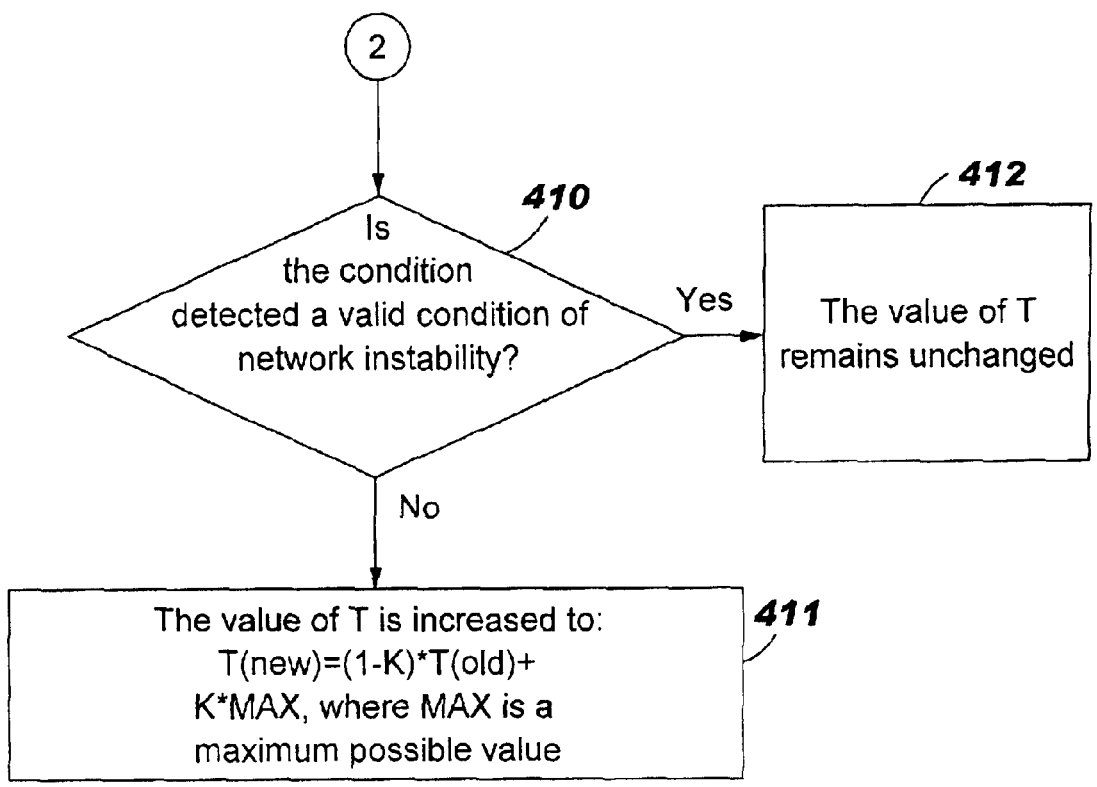

As stated in the Background Information section, network instability situations that cause one or more network devices, e.g., routers, switches, to become overloaded does not become detected until well after the loss or discarding of data. If, however, a parameter that indicates network instability situations was monitored, then a network instability situation may be detected prior to the instability situation significantly affecting the network. It would therefore be desirable to detect conditions of network instability by monitoring a parameter or attribute of a network device, e.g., router, switch, that may be used to indicate network instability thereby detecting network instability situations earlier than in prior art. FIG. 4 describes a method for detecting conditions of network instability by monitoring a parameter or attribute of a network device, e.g., router, switch, that may be used to indicate network instability thereby detecting network instability situations earlier than in prior art.

Figure 2:
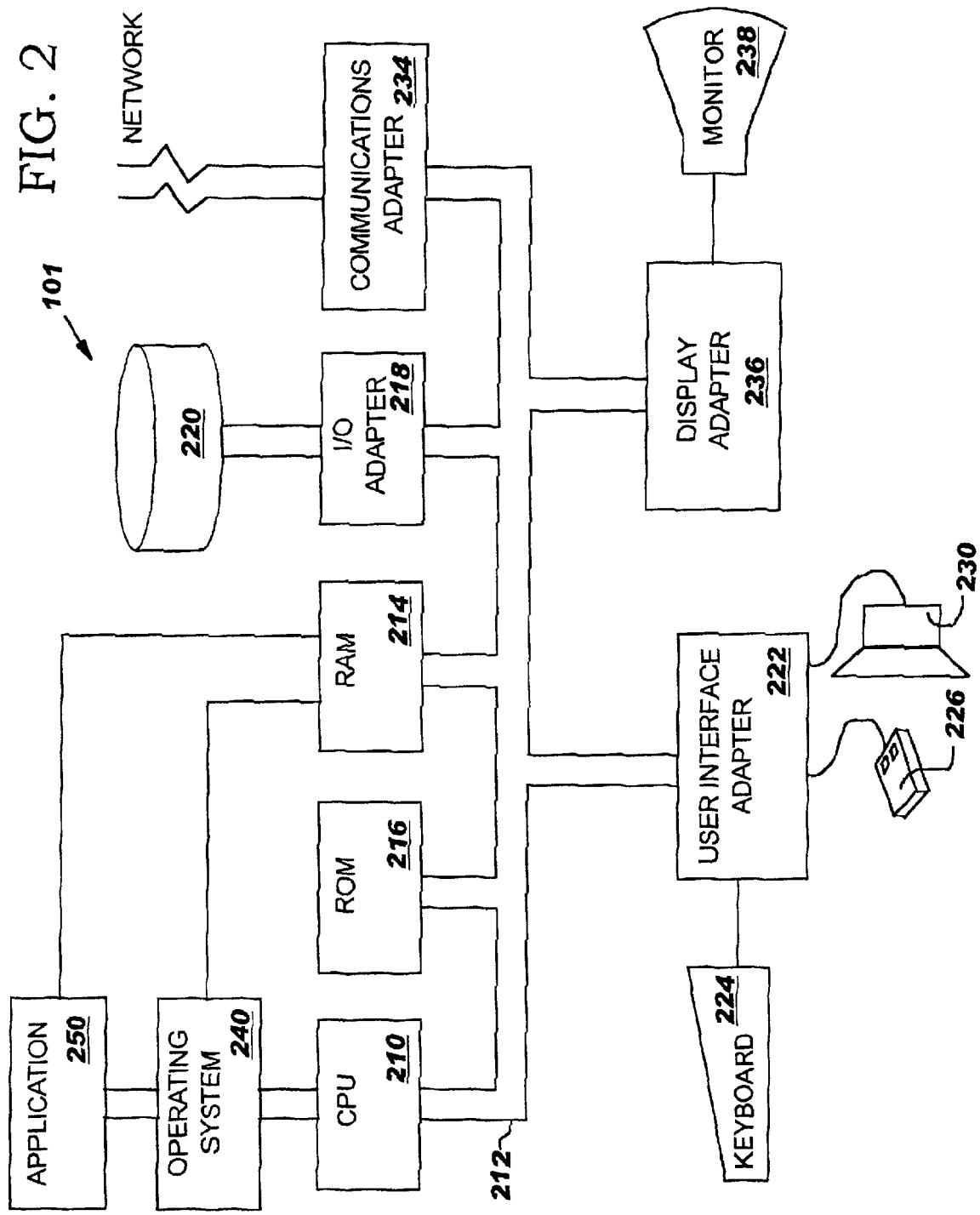
FIG. 2 illustrates an embodiment of a client in the network system configured in accordance with the present invention.

FIG. 2—Hardware Configuration of Client

FIG. 2 illustrates a typical hardware configuration of client 101 which is representative of a hardware environment for practicing the present invention. Client 101 may have a central processing unit (CPU) 210 coupled to various other components by system bus 212. An operating system 240, may run on CPU 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, a web browser. Read-Only Memory (ROM) 216 may be coupled to system bus 212 and include a Basic Input/Output System ("BIOS") that controls certain basic functions of client 101. Random access memory (RAM) 214 and Input/Output (I/O) adapter 218 may also be coupled to system bus 212. It should be noted that software components including operating system 240 and application 250 may be loaded into RAM 214 which may be client's 101 main memory for execution. I/O adapter 218 may be a small computer system interface ("SCSI") adapter that communicates with a disk unit 220, e.g., disk drive. It is noted that the web browser may reside in disk unit 220 or in application 250.

Referring to FIG. 2, client 101 may further comprise a communications adapter 234 coupled to bus 212. Communications adapter 234 may enable client 101 to communicate with router 102 (FIG. 1) or a network device (not shown), e.g., server, coupled to network 103 (FIG. 1). I/O devices may also be connected to system bus 212 via a user interface adapter 222 and a display adapter 236. Keyboard 224, mouse 226 and speaker 230 may all be interconnected to bus 212 through user interface adapter 222. Event data may be inputted to client 101 through any of these devices. A display monitor 238 may be connected to system bus 212 by display adapter 236. In this manner, a user is capable of inputting, e.g., issuing requests to read web pages, issuing input to indicate whether a network instability condition should have been detected or should not have been detected as described in FIG. 4, to client 101 through keyboard 224 or mouse 226 and receiving output from client 101 via display 238.

Figure 3:
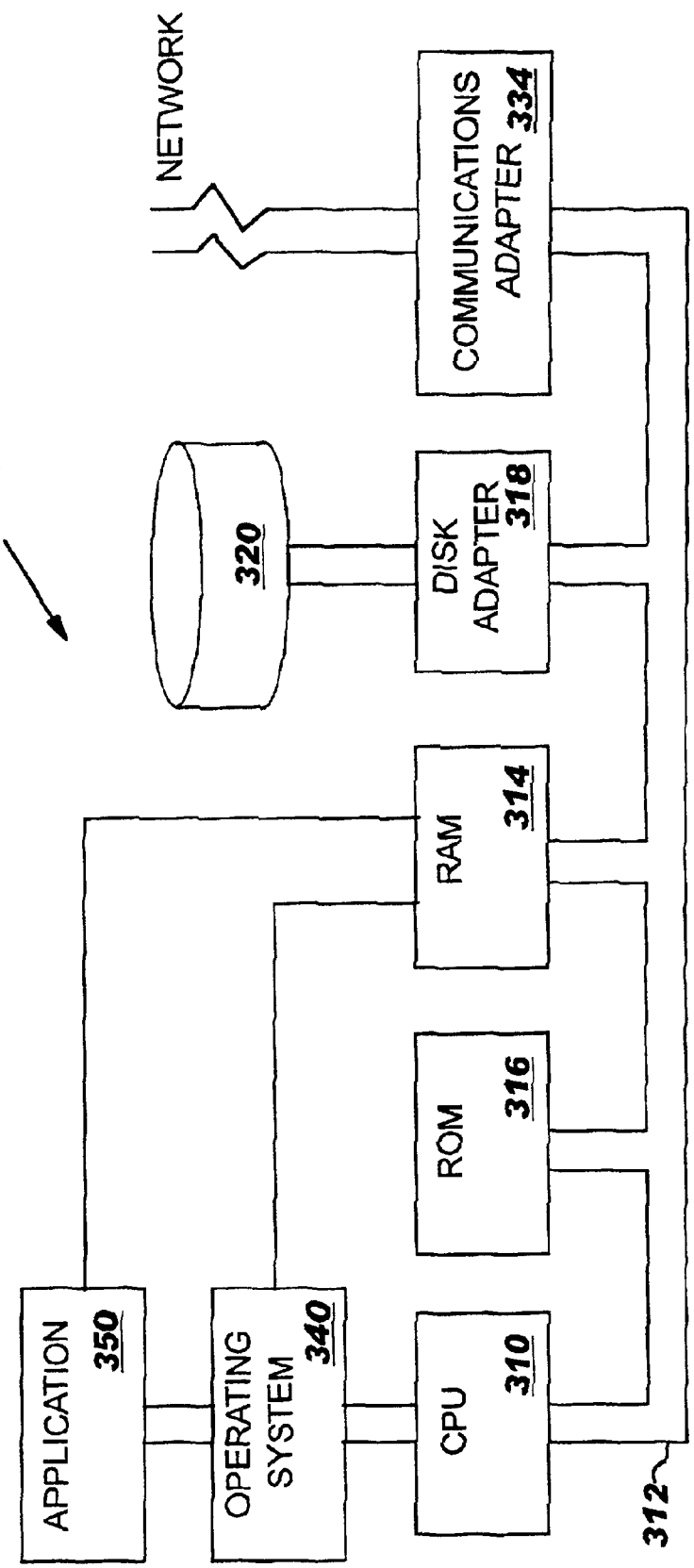
FIG. 3 illustrates an embodiment of a router in accordance with the present invention.

FIG. 3—Hardware Configuration of Router

FIG. 3 illustrates an embodiment of the present invention of router 102. Referring to FIG. 3, router 102 may comprise a processor 310 coupled to various other components by system bus 312. An operating system 340, may run on processor 310 and provide control and coordinate the functions of the various components of FIG. 3. An application 350 in accordance with the principles of the present invention may run in conjunction with operating system 340 and provide calls to operating system 340 where the calls implement the various functions or services to be performed by application 350. Application 350 may include, for example, a program for detecting conditions of network instability as described in FIG. 4, a cache for storing labels of a monitored attribute as described in FIG. 4. Read-Only Memory (ROM) 316 may be coupled to system bus 312 and include a basic input/output system ("BIOS") that controls certain basic functions of router 102. Random access memory (RAM) 314, disk adapter 318 and communications adapter 334 may also be coupled to system bus 312. It should be noted that software components including operating system 340 and application 350 may be loaded into RAM 314 which may be the router's 102 main memory for execution. Disk adapter 318 may be a small computer system interface ("SCSI") adapter that communicates with a disk unit 320, e.g., disk drive. In one embodiment, disk adapter 318 may store a cache configured to store labels of a monitored attribute as described in FIG. 4. In other embodiments, the cache configured to store labels of a monitored attribute as described in FIG. 4 may reside in other hardware elements, e.g., disk unit 320, non-volatile memory (not shown), that may or may not be shown in FIG. 3. It is noted that such embodiments would fall within the scope of the present invention. It is further noted that the program of the present invention that detects conditions of network instability, as described in FIG. 4, may reside in disk unit 320 or in application 350. Communications adapter 334 may interconnect bus 312 with network 103 enabling router 102 to communicate with client 101 and a network device (not shown), e.g., server, coupled to network 103.

It is noted that the description of router 102 in FIG. 3 may also be the description of a router located at the edge of a subnet, a switch or an edge device. It is further noted that these other devices, e.g., router located at the edge of a subnet, switch, edge device, may also store the program of the present invention that detects conditions of network instability, as described in FIG. 4, in their disk unit 320 or application 350.

Implementations of the invention include implementations as a computer system programmed to execute the method or methods described herein, and as a computer program product. According to the computer system implementations, sets of instructions for executing the method or methods are resident in RAM 314 of one or more computer systems configured generally as described above. Until required by router 102, the set of instructions may be stored as a computer program product in another computer memory, for example, in disk drive 320 (which may include a removable memory such as an optical disk or floppy disk for eventual use in disk drive 320). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

FIG. 4—Method for Detecting Conditions of Network Instability

FIG. 4 is a flowchart of one embodiment of the present invention of a method 400 for detecting conditions of network instability.

Referring to FIG. 4, in conjunction with FIGS. 1 and 3, in step 401, the program of the present invention may monitor an attribute indicative of network instability, e.g., processor and/or co-processor utilization, packet arrival rates, packet peak rates, packet size distribution, packet clustering tendencies, buffer usage patterns, occurrence of peak utilization, out-of-buffer conditions, packet discard rates, of router 102 in relation to receiving a plurality of packets of data. That is, the attribute indicative of network instability may be monitored in response to receiving a plurality of packets of data over a period of time. For example, processor 310 utilization, may refer to monitoring the utilization of processor 310 which is dependent upon traffic patterns, i.e., the number of packets received in a particular period of time. In another example, packet arrival rates may refer to monitoring the rates packets are received by router 102. In another example, occurrence of peak utilization may refer to monitoring the number of times processor 310 has been fully utilized which is dependent upon traffic patterns, i.e., the number of packets received in a particular period of time. In another example, packet size distribution may refer to monitoring the length of each of the received packets. In another example, packet clustering tendencies may refer to monitoring the receipt of bursts of packets. In another example, packet discard rates may refer to monitoring the number of packets discarded by router 102 within a particular period of time. In another example, buffer usage patterns may refer to monitoring the availability of buffers to store packets. In another example, out-of-buffer conditions may refer to monitoring the number of times a buffer is full, i.e., the number of times a buffer is not available. Each of these examples involves monitoring an attribute that indicates network instability. By monitoring an attribute indicative of network instability, network instability situations may be detected earlier than in prior art as explained in greater detail further below.

It is noted that even though the illustrative attributes may be found in the MIB that the present invention is not limited to monitoring attributes found in the MIB. That is, it is noted that these attributes are merely exemplary and that router 102 may be configured to monitor other attributes that may be indicative of a network instability condition. It is further noted that other attributes not found in the MIB that may be indicative of a network instability condition would fall within the scope of the present invention.

In one embodiment, each monitored attribute indicative of network instability, e.g., packet size distribution, may be associated with a plurality of labels. Labels may refer to variables. It is noted that even though the following discusses labels being associated with a monitored attribute that numerical values may also be associated with a monitored attribute.

For example, for monitoring the attribute of packet size distribution, label "A" may be associated with packet lengths between 16 and 32 bytes. Label "B" may be associated with packet lengths 32 and 64 bytes. Label "C" may be associated with packet lengths 64 and 84 bytes. Label "D" may be associated with packet lengths between 84 and 128 bytes and so forth. These labels may be stored in a cache such as a cache implementing the least recently used algorithm. It is noted that even though the following discusses a cache that implements the least recently used algorithm to store a portion of the labels associated with the monitored attribute that any cache may be used to store a portion of the labels associated with the monitored attribute. It is further noted that embodiments implementing such caches would fall within the scope of the present invention.

Figure 5A:
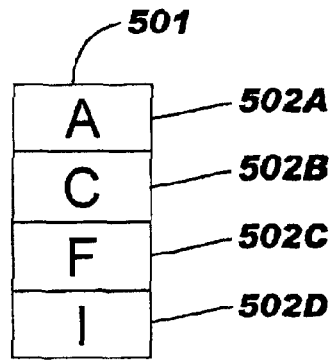
FIGS. 5A–C illustrate an embodiment of a least recently used algorithm implemented by a cache in accordance with the present invention.
Figure 5B:
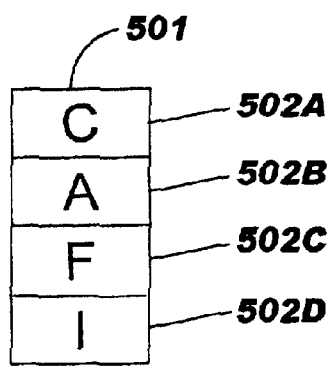
Figure 5C:
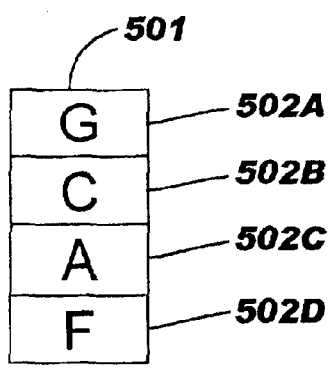

A brief discussion of a cache implementing the least recently used algorithm is deemed appropriate. A cache implementing the least recently used algorithm is illustrated in FIGS. 5A–C. Referring to FIGS. 5A–C, a single stack 501 may comprise a set of cache entries 502A–D where each cache entry may store a label for a particular monitored attribute. Cache entries 502A–D may collectively or individually be referred to as cache entries 502 or cache entry 502, respectively. It is noted that stack 501 may comprise any number of cache entries 502 and that FIGS. 5A–C are illustrative.

As stated above, each cache entry 502 may store a particular label. Referring to FIG. 5A, label A is located on top of stack 501 at cache entry 502A. Label I is located at the bottom of stack 501 at cache entry 502D. Upon monitoring the attribute of router 102 after a period of time, the program of the present invention may determine the next item, i.e., the next label. For example, if the packet length of the next received packet had a length of 80 bytes, then the next label requested may be label "C" using the above example.

The program of the present invention may then determine if the requested label, e.g., label "C", is present in the cache. If the label is present in the cache, a "cache hit" is said to occur. When a cache hit occurs, the cache entry comprising the label moves to the first stack position as illustrated in FIG. 5B.

However, if the next label, e.g., label "G", is not present in the cache, then a "cache miss" is said to occur. When a cache miss occurs, the requested label may be retrieved from a non-volatile storage unit, e.g., disk unit 320, to be stored in the first stack position as illustrated in FIG. 5C. When a new label is inserted in stack 501, cache entry 502, e.g., cache entry 502D, in the last stack position may be evicted. For example, label "I" was evicted in stack 501 as illustrated in FIG. 5C.

It is noted that the cache implementing the least recently used algorithm, as discussed above, may be embodied in either software or hardware in router 102. It is further noted that the cache implementing the least recently used algorithm, as described above, may store numerical values instead of labels associated with a monitored attribute. A cache implementing a least recently used algorithm is described in more detail in the textbook entitled "Computer Architecture: a Quantitative Approach", J. Hennessy et al., published by Morgan Kaufmann, 1990.

As stated above, if the requested label is present in the cache, then a "cache hit" is said to occur. If the requested label is not present in the cache, then a "cache miss" is said to occur. A hit ratio as used herein may refer to the following equation:

$$\text{Hit Ratio} = \frac{\text{number of cache hits}}{(\text{number of cache hits} + \text{number of cache misses})} \tag{EQ1}$$

Hence, a hit ratio may be based on the number of requested items, i.e., labels, that are currently stored in the cache.

Referring to FIG. 4, in step 402, a hit ratio (denoted as h(t)) for a cache, e.g., cache implementing least recently used algorithm as shown in FIGS. 5A–C, may be tracked within a particular period of time (denoted as dt). That is, the hit ratio for a cache storing the labels associated with a monitored attribute may be measured every particular period of time (denoted as dt).

In step 403, a determination may be made as to whether the absolute value of the acceleration of the hit ratio is less than a threshold value. The absolute value of the acceleration of the hit ratio is determined by the absolute value of the second derivative of the hit ratio which may be approximated by the absolute value of the following equation:

$$(h(t-2*dt)-2*h(t-dt)+h(t))/2 \tag{EQ2}$$

where t is an index of time; where dt is a time interval that the hit ratio h(t) is measured; and where h(t) is the hit ratio at time t.

If the absolute value of the acceleration of the hit ratio is less than a threshold value (denoted as T), then router 102 did not detect a condition of network instability in step 404. That is, if there is not an accelerated change in the hit ratio of a cache storing labels associated with a monitored attribute indicative of network instability, then router 102 did not detect a condition of network instability. For example, if the absolute value of the acceleration of the hit ratio of a cache storing labels associated with the monitored attribute of packet discard rates did not exceed the threshold value, then router 102 may not have received an inordinate amount of packets to become overloaded. That is, router 102 may not be experiencing a network instability situation as the absolute value of the acceleration of the hit ratio did not exceed the threshold value.

In step 405, a determination may be made as to whether router 102 failed to detect a network instability situation. A determination as to whether router 102 failed to detect a network instability situation may be made by a network administrator. That is, a network administrator may determine that a network instability situation has occurred even though router 102 failed to detect such a situation. If router 102 failed to detect a network instability situation, then, in step 406, the value of the threshold value (T) may be decreased to:

$$T(\text{new})=(1-K)*T(\text{old}) \tag{EQ3}$$

where K is a constant between the values of 0 and 1; where T(old) is a threshold value prior to being decreased; and where T(new) is a threshold value after being decreased.

By decreasing the value of the threshold, a lower absolute value of the acceleration of the hit ratio is required to detect a condition of network instability. Hence, an expanded number of situations or conditions may be deemed to be indicative of network instability.

If, however, router 102 correctly identified a non-network instability situation, then, in step 407, the value of the threshold value (T) remains unchanged.

Returning to step 403, if the absolute value of the acceleration of the hit ratio is greater than or equal to the threshold value (T), then router 102 detected a condition of network instability in step 408. That is, an accelerated change in the hit ratio may indicate an unstable condition. For example, a cache may store labels associated with a monitored attribute, e.g., packet size distribution, indicative of network instability. If the cache experiences an accelerated change in the hit ratio, then an unstable condition may be indicated. For example, an accelerated change in the hit ratio indicating an influx in the number of received packets may indicate receipt of an unusually high number of packets, i.e., high packet peak rates, which may cause router 102 to become overloaded thereby causing router 102 to process packets at a slower rate or even crash. In another example, an accelerated change in the hit ratio indicating a sharp increase in the discard rate may indicate receipt of an unusually high number of packets which may cause router 102 to become overloaded thereby causing router 102 to process packets at a slower rate or even crash. Hence, detecting an accelerated change in the hit ratio may detect a condition of network instability.

In step 409, router 102 may transmit an alert to management control console 104 (also referred to as a central management station) indicating the detection of a condition of network instability.

In step 410, a determination may be made by a network administrator as to whether the condition detected is a valid condition of network instability. A detection of network instability may not be an administrative emergency and hence may be deemed to not be a valid condition of network instability. For example, router 102 may receive an influx of packets at around 3:00 p.m. to 3:15 p.m. each work day that may cause an accelerated change in the hit ratio when the hit ratio is tracked during that time. If this is a temporary phenomena that happens each work day, a network administrator may determine not to take corrective action. Hence, the network administrator may deem the condition detected to not be a valid condition of network instability.

If the condition detected is determined to not be a valid condition of network instability, then, in step 411, the value of the threshold value (T) may be increased to:

$$T(\text{new})=(1-K)*T(\text{old})+K*\text{MAX} \tag{EQ4}$$

where K is a constant between the values of 0 and 1; where T(old) is a threshold value prior to being increased; where T(new) is a threshold value after being increased; and where MAX is a maximum value.

By increasing the value of the threshold, a higher absolute value of the acceleration of the hit ratio is required to detect a condition of network instability. Hence, a more limited number of situations or conditions may be deemed to be indicative of network instability.

If, however, the condition detected is determined to be a valid condition of network instability, then, in step 412, the value of the threshold value (T) remains unchanged.

It is noted that method 400 may be executed in a different order presented and that the order presented in the discussion of FIG. 4 is illustrative. It is further noted that certain steps in FIG. 4 may be executed almost concurrently. It is further noted that certain steps, e.g., steps 401–404, 406–409 and 411–412, may be implemented by a program in router 102 residing in application 350 or disk unit 320. It is further noted that these steps, e.g., steps 401–404, 406–409 and 411–412, may be performed by other devices such as a switch or edge device. It is further noted that certain steps, e.g., steps 405, 410, may be implemented by a network administrator.

Although the system, computer program product and method are described in connection with several embodiments, it is not intended to be limited to the specific forms set forth herein; but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for detecting conditions of network instability comprising the steps of:
    monitoring an attribute of a network device in relation to a receipt of a plurality of packets of data, wherein a plurality of labels are associated with said attribute, wherein a portion of said plurality of labels are stored in a cache;
    tracking a hit ratio of said cache within a particular period of time based on a number of requested labels that are stored in said cache; and
    detecting a condition of said network instability based on said hit ratio.

2. The method as recited in claim 1, wherein said condition of said network instability is detected based on an acceleration of said hit ratio.

3. The method as recited in claim 2, wherein if an absolute value of said acceleration of said hit ratio is greater than or equal to a threshold value then said condition of said network instability is detected.

4. The method as recited in claim 3, wherein said absolute value of said acceleration of said hit ratio is determined by an absolute value of a second derivative of said hit ratio.

5. The method as recited in claim 3, wherein said absolute value of said acceleration of said hit ratio is determined by an absolute value of:

$$(h(t-2*dt)-2*h(t-dt)+h(t))/2,$$

wherein t is an index of time;
wherein dt is a time interval; and
wherein h(t) is said hit ratio at time t.

6. The method as recited in claim 3, wherein if said detection of said condition of said network instability is not a valid detection then said threshold value is increased to:

$$T(\text{new})=(1-K)*T(\text{old})+K*MAX,$$

wherein K is a constant;
wherein T(old) is a threshold value prior to being increased;
wherein T(new) is a threshold value after being increased; and
wherein MAX is a maximum value.

7. The method as recited in claim 3, wherein if said detection of said condition of said network instability is a valid detection than said threshold value is unchanged.

8. The method as recited in claim 2, wherein if an absolute value of said acceleration of said hit ratio is less than a threshold value then said condition of said network instability is not detected.

9. The method as recited in claim 1, wherein said attribute monitored is at least one of the following: processor utilization, packet arrival rates, packet peak rates, packet size distribution, packet clustering tendencies, buffer usage patterns, occurrence of peak utilization, out-of-buffer conditions and packet discard rates.

10. The method as recited in claim 1 further comprising the step of:
    transmitting an alert indicating said detection of said condition of said network instability.

11. A computer program product embodied in a machine readable medium for detecting conditions of network instability comprising the programming steps of:
    monitoring an attribute of a network device in relation to a receipt of a plurality of packets of data, wherein a plurality of labels are associated with said attribute, wherein a portion of said plurality of labels are stored in a cache;
    tracking a hit ratio of said cache within a particular period of time based on a number of requested labels that are stored in said cache; and
    detecting a condition of said network instability based on said hit ratio.

12. The computer program product as recited in claim 11, wherein said condition of said network instability is detected based on an acceleration of said hit ratio.

13. The computer program product as recited in claim 12, wherein if an absolute value of said acceleration of said hit ratio is greater than or equal to a threshold value then said condition of said network instability is detected.

14. The computer program product as recited in claim 13, wherein said absolute value of said acceleration of said hit ratio is determined by an absolute value of a second derivative of said hit ratio.

15. The computer program product as recited in claim 13, wherein said absolute value of said acceleration of said hit ratio is determined by an absolute value of:

$$(h(t-2*dt)-2*h(t-dt)+h(t))/2,$$

wherein t is an index of time;
wherein dt is a time interval; and
wherein h(t) is said hit ratio at time t.

16. The computer program product as recited in claim 13, wherein if said detection of said condition of said network instability is not a valid detection then said threshold value is increased to:

$$T(\text{new})=(1-K)*T(\text{old})+K*MAX,$$

wherein K is a constant;
wherein T(old) is a threshold value prior to being increased;
wherein T(new) is a threshold value after being increased; and
wherein MAX is a maximum value.

17. The computer program product as recited in claim 13, wherein if said detection of said condition of said network instability is a valid detection than said threshold value is unchanged.

18. The computer program product as recited in claim 12, wherein if an absolute value of said acceleration of said hit ratio is less than a threshold value then said condition of said network instability is not detected.

19. The computer program product as recited in claim 11, wherein said attribute monitored is at least one of the following: processor utilization, packet arrival rates, packet peak rates, packet size distribution, packet clustering tendencies, buffer usage patterns, occurrence of peak utilization, out-of-buffer conditions and packet discard rates.

20. The computer program product as recited in claim 11 further comprising the programming step of:
   transmitting an alert indicating said detection of said condition of said network instability.

21. A system, comprising:
   a memory unit operable for storing a computer program operable for detecting conditions of network instability; and
   a processor coupled to said memory unit, wherein said processor, responsive to said computer program, comprises:
      circuitry operable for monitoring an attribute of a network device in relation to a receipt of a plurality of packets of data, wherein a plurality of labels are associated with said attribute, wherein a portion of said plurality of labels are stored in a cache;
      circuitry operable for tracking a hit ratio of said cache within a particular period of time based on a number of requested labels that are stored in said cache; and
      circuitry operable for detecting a condition of said network instability based on said hit ratio.

22. The system as recited in claim 21, wherein said condition of said network instability is detected based on an acceleration of said hit ratio.

23. The system as recited in claim 22, wherein if an absolute value of said acceleration of said hit ratio is greater than or equal to a threshold value then said condition of said network instability is detected.

24. The system as recited in claim 23, wherein said absolute value of said acceleration of said hit ratio is determined by an absolute value of a second derivative of said hit ratio.

25. The system as recited in claim 23, wherein said absolute value of said acceleration of said hit ratio is determined by an absolute value of:

$$(h(t-2*dt)-2*h(t-dt)+h(t))/2,$$

wherein t is an index of time;

wherein dt is a time interval; and wherein h(t) is said hit ratio at time t.

26. The system as recited in claim 23, wherein if said detection of said condition of said network instability is not a valid detection then said threshold value is increased to:

$$T(\text{new})=(1-K)*T(\text{old})+K*\text{MAX},$$

wherein K is a constant;

wherein T(old) is a threshold value prior to being increased;

wherein T(new) is a threshold value after being increased; and wherein MAX is a maximum value.

27. The system as recited in claim 23, wherein if an absolute value of said acceleration of said hit ratio is less than a threshold value then said condition of said network instability is not detected.

28. The system as recited in claim 22, wherein if an absolute value of said acceleration of said hit ratio is less than a threshold value then said condition of said network instability is not detected.

29. The system as recited in claim 21, wherein said attribute monitored is at least one of the following: processor utilization, packet arrival rates, packet peak rates, packet size distribution, packet clustering tendencies, buffer usage patterns, occurrence of peak utilization, out-of-buffer conditions and packet discard rates.

30. The system as recited in claim 21, wherein said processor further comprises:
   circuitry operable for transmitting an alert indicating said detection of said condition of said network instability.

* * * * *